United States Patent [19]
Henson

[11] Patent Number: 5,419,696
[45] Date of Patent: May 30, 1995

[54] EXTRUSION DIE FOR EXTRUDING LAMINATED DOUGH PRODUCTS

[75] Inventor: William D. Henson, Duncanville, Tex.

[73] Assignee: Recot, Inc., Plano, Tex.

[21] Appl. No.: 267,165

[22] Filed: Jun. 28, 1994

Related U.S. Application Data

[62] Division of Ser. No. 78,862, Jun. 21, 1993, Pat. No. 5,384,142.

[51] Int. Cl.⁶ .................. A23P 1/00; B29C 47/00
[52] U.S. Cl. .................. 425/382.4; 99/450.1; 264/176.1; 425/467
[58] Field of Search ............. 99/450.1, 450.2; 425/382.4, 467, 131.1; 426/496, 502, 516

[56] References Cited

U.S. PATENT DOCUMENTS

| | | | |
|---|---|---|---|
| 2,858,219 | 10/1958 | Benson | 426/516 |
| 3,851,084 | 11/1974 | Rossen et al. | 426/502 |
| 4,113,411 | 9/1978 | Terragni | 425/325 |
| 4,113,819 | 9/1978 | Hayashi et al. | 426/502 |
| 4,675,199 | 1/1987 | Hsu | 425/325 |
| 4,883,421 | 11/1989 | Morgan | 425/382.4 |
| 4,892,473 | 1/1990 | Elia et al. | 425/382.4 |
| 4,900,572 | 2/1990 | Repholz et al. | 426/516 |
| 5,160,684 | 11/1992 | Misawa | 264/173 |

Primary Examiner—George Yeung
Attorney, Agent, or Firm—Rothwell, Figg, Ernst & Kurz

[57] ABSTRACT

Apparatus and processes for the production of food products based on an extruded dough are based on a novel extrusion die for extruding, preferably on a continuous basis, a multi-layer, laminated dough mass from a single die opening. A chamber within the die contains a divider bar for dividing the flowing dough mass into a plurality of dough masses that are united prior to extrusion through the die opening. When the dough mass is cooked, it partially delaminates to provide a desired texture. The desired texture, which can range from relatively dense to relatively light and flaky, is obtained through adjusting the position of the divider bar within the extrusion die and/or the geometry of the divider bar.

4 Claims, 3 Drawing Sheets

EXTRUSION DIE FOR EXTRUDING LAMINATED DOUGH PRODUCTS

This is a division of application Ser. No. 08/078,862, filed Jun. 21, 1993, now U.S. Pat. No. 5,384,142.

BACKGROUND OF THE INVENTION

1. Field of the Invention

The present invention relates to apparatus and processes for the production of food products from an extruded dough. More particularly, the present invention provides a novel extrusion die for continuously extruding a laminated, multi-layer dough mass from a single die opening.

2. Description of the Background Art

In the baked goods industry, it is common to produce baked goods, such as pastry products and crackers having a desirable "flaky" or multi-layered texture, by producing dough sheets that are overlaid to form a multi-layered dough mass. The dough mass subsequently is passed through one or more roll sets, or is compressed by a similar process, to produce a "laminated" dough mass. The laminated dough is reduced in overall thickness but, importantly, the compression process has not completely destroyed its multi-layer nature. Upon cooking under relatively stringent conditions (such as baking or frying), moisture in the form of steam that is released from the dough mass and causes partial delamination of the dough layers, producing a desired texture in the fully cooked product. The presence of a leavening agent, such as sodium or ammonium bicarbonate, also causes delamination during the cooking process. The final texture ultimately depends on the composition of the dough and the vigor with which the dough layers were laminated, among other variables.

As described in U.S. Pat. No. 4,675,199 issued to Nestec S. A. on Jun. 23, 1987, it has also been known to produce pasta products from laminated dough sheets so as to attain desirable eating qualities, that is, a less-dense mouth feel. The dough sheet can be produced in a manner similar to the pastry and cracker dough process described above, by folding a dough sheet many times and passing the folded sheet through rollers to flatten and compress the dough. The Nestec patent proposes to simulate such a process through the use of an extrusion die containing a plurality of openings for simultaneously extruding a plurality of continuous pasta dough sheets in a vertical orientation. The extruded sheets are united and compressed downstream of the die by one or more roller sets into a single sheet, which is then cut into a desired shape.

The same improvement to product texture—rendering the finished product lighter in texture, with a less-dense mouth feel—that is attained through the lamination technique is desired in the production of certain snack food products such as snack chips. It is known to those skilled in the art to produce snack food products, including various types of snack chips, by forming a dough mass, continuously extruding the mass in the form of a monolayer ribbon or other desired shape, cutting the monolayer extrudate into a desired size and shape, and then cooking and seasoning the product. The dough typically is extruded under low work conditions, and with a moisture content of about 25 to 45 percent (wet basis), to produce an extrudate that is stable enough to survive subsequent handling without breaking.

To produce a finished, monolayer product with consumer-acceptable texture, for example a light and less dense mouth feel, a relatively thin extrusion die thickness typically is needed. Snack food products prepared from relatively thick, extruded dough sheets tend to have a dense mouth feel and texture that is not favored by consumers. The use of a thin extrusion die opening, however, leads to numerous problems. The pressure of the dough mass will build at the die opening and, depending on the composition of the dough, this pressure increase will require excessive working of the dough mass by the extruder and will result in a high rate of breakage of the intermediate or finished product. The use of a thin extrusion die also will (1) cause increased work input to the dough, contributing to the undesired dense, tough texture; (2) cause increased occurrence of partially plugged die openings; (3) require smaller tolerances in the die opening machining and (4) increase the velocity of dough from the die, for example beyond the handling capability of conventional lamination rolls. Although the multi-layering processes described above have theoretical utility in the production of snack food products such as snack chips, the costs associated with those processes are prohibitive. Moreover, certain snack food product shapes (for example, those with rippled edges) do not lend themselves to production via such processes.

SUMMARY OF THE INVENTION

Accordingly, there has remained a need for improved apparatus and processes for the production of food products, including snack food products, from laminated dough in order to obtain a lighter texture and/or an improved mouth feel. Ideally, such apparatus and processes would be used in combination with conventional food production equipment and technology, thereby minimizing start-up costs. These and other needs have now been met by the extrusion die apparatus and processes described herein.

In one aspect, the present invention provides an extrusion die apparatus for extruding a dough product, the die comprising an inlet for receiving a dough mass, an outlet for an extruded dough product and a chamber communicating between the inlet and outlet through which the dough mass flows. The chamber of the die includes a divider bar for dividing the dough mass flowing through the chamber, and then uniting the divided dough masses, whereby the united dough mass is extruded through the outlet as a dough laminate.

In another aspect of the invention, there is provided a process for producing a snack food product exhibiting a preselected texture, comprising the steps of providing an uncooked dough mass, contacting the dough mass with a divider bar to divide the mass into a plurality of portions, uniting the plurality of portions and extruding them on a continuous basis through a die opening of an extrusion die.

The extruded dough products produced by the apparatus and processes of the invention resemble dough products prepared from the prior art overlaying-and-laminating processes. The dough extrudates are comprised of a plurality of closely associated layers that, upon cooking (especially high heat transfer cooking such as frying or impingement drying), at least partially delaminate and thereby produce a desired texture. Advantageously, the degree of delamination can be preselected and adjusted by altering the shape of the divider bar and/or its location with respect to the die opening.

The degree of difficulty in obtaining desired product thinness and texture increases substantially as the extrusion die opening is made smaller. This is because such texture-affecting factors as pressure, viscosity, and work input to the dough increase geometrically as the die gap is made smaller. Therefore, a further advantage of the present invention is that it provides a means of imparting desirable laminated texture properties to very thin extruded sheets without conventional means of thickness reduction, such as reduction of thickness by using sheeting rolls subsequent to extrusion, or, alternatively, by the use of more than two extruders to combine two separate dough streams within a single die head for coextrusion through a thin orifice as shown by, e.g., U.S. Pat. No. 3,851,084 to Rossen et al.

DETAILED DESCRIPTION OF THE PREFERRED EMBODIMENTS

Figure 1:
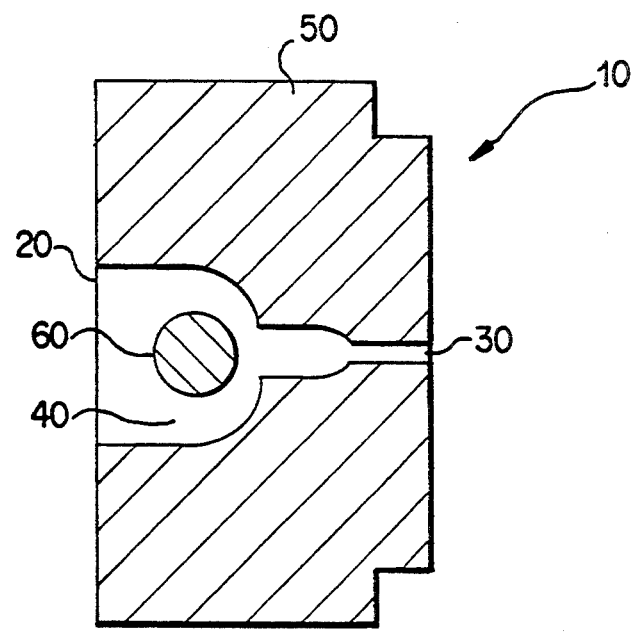
FIG. 1 is an elevational view in section of an extrusion die apparatus according to the present invention.

The present invention will be readily understood in connection with the accompanying drawings, wherein FIG. 1 presents a sectional view of an extrusion die constructed according to the principles of the present invention. As seen in FIG. 1, an extrusion die designated generally by the reference numeral 10 includes an inlet 20 for receiving a dough mass to be extruded. An outlet 30 is provided, through which the dough mass is extruded, with the inlet and outlet being connected by a chamber portion 40 within the die block 50.

Installed within chamber 40 of die block 50 is a divider bar, indicated generally by reference numeral 60. The divider bar 60 functions, in accordance with the principals of the invention and as indicated with arrows in FIG. 2, to divide the dough mass that is entering the chamber into two portions. It will be appreciated and understood that the divided dough mass incompletely reunites within chamber 40, downstream of the divider bar 60. In other words, the divided dough masses come into contact with each other and merge into a mass that flows together, although the presence of two distinct masses within that flowing mass is not totally lost. The bond between the dough masses is such that the two masses are still capable of at least partial delamination. The incompletely reunited dough masses then are extruded together through the outlet 30 of the die block 50. The shape of the dough extrudate will be governed by the geometry of the outlet 30, and advantageously is not adversely affected by the presence of the divider bar 60.

Figure 2:
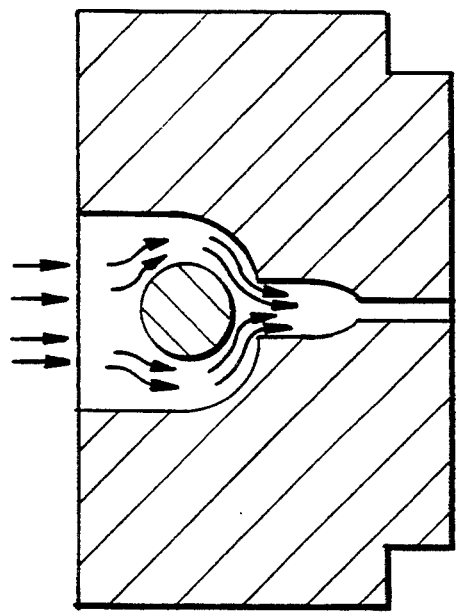
FIG. 2 is an elevational view in section of the die shown in FIG. 1 showing the flow of dough through the extrusion die.
Figure 3:
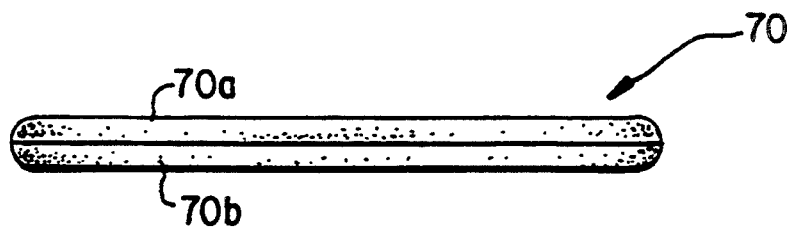
FIG. 3 is an elevational view of a dough mass extruded from the extrusion die of FIGS. 1 and 2.

FIG. 3 illustrates a dough mass that has been extruded through the die of FIGS. 1 and 2. The dough mass 70 is comprised of two layers, 70a and 70b, such that the dough mass is characterized as a dough laminate that closely resembles a dough mass prepared by overlaying two dough sheets and laminating them by passage through calendar rollers. When the dough mass is cooked, moisture that is released from the dough will cause partial delamination of layers 70a and 70b, thereby contributing to the desired texture of the final product. Advantageously, the degree of such delamination can be pre-selected and matched to the rheological and other characteristics of the dough formulation.

An important feature of the present invention is found in the ability to influence the texture of the final product by altering the shape (geometry) of the divider bar, and/or the position of the divider bar relative to the outlet of the die. In the absence of a divider bar, a true monolayer dough mass will be extruded. As mentioned earlier, snack chips manufactured from monolayers can have an undesirable dense mouth feel, which typically is remedied by extruding the dough in as thin a ribbon as is possible. We have found that as the divider bar is moved closer and closer to the die opening, the bond between the dough layers in the extruded dough mass becomes weaker and weaker, leading to an increasingly flaky, blistered or even "pillowy" final product. Thus, those skilled in this field will be able to adjust the position of the bar and/or the shape of the bar to attain a suitably textured final product.

Figure 4A:
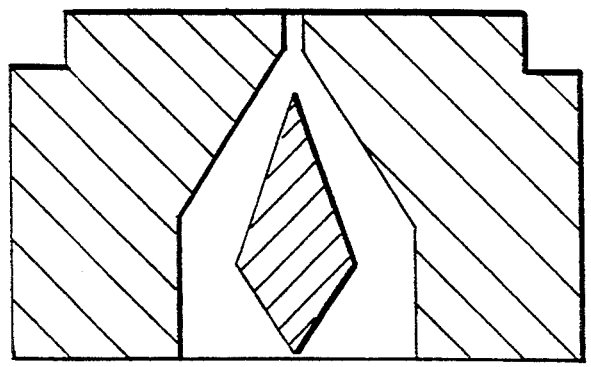
FIG. 4A is an elevational view in section of another embodiment of an extrusion die in accordance with the present invention.
Figure 5A:
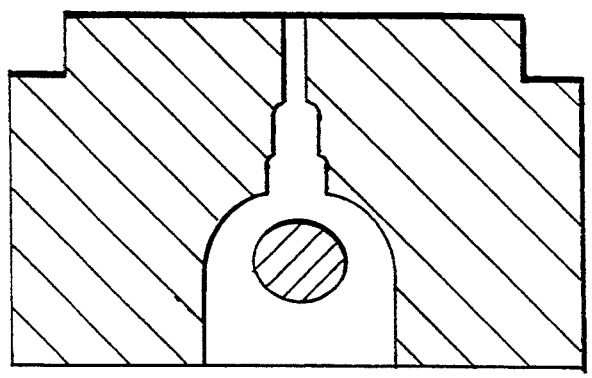
FIG. 5A is an elevational view in section of another embodiment of an extrusion die in accordance with the present invention.

The shape of the divider bar can vary, with resultant variations in the degree of adhesion between the dough layers of the extruded dough mass. FIGS. 1, 2 and 5A illustrate cylindrical divider bars, that is, bars having a circular cross section. Divider bars having other shapes will be useful, including bars with regular or irregular polygonal cross sections. Thus, FIG. 4A illustrates a divider bar having a rhombus shaped cross section as one such possible divider bar, and other polygonal cross sections will be useful. Those skilled in this field will recognize that the rheological properties of the dough, its composition, extrusion pressure, the shape of the die chamber and the shape and location of the divider bar within the die chamber all can affect the ultimate properties of the extruded dough mass. Thus, while it is preferable to locate the divider bar so that it is disposed in the chamber generally parallel to a central axis of the die opening, other locations are possible. Such persons skilled in this field, based on the information contained herein, will be able to select a preferred configuration based upon the properties desired in the final product.

Divider bar 60 preferably includes a friction-reducing surface to promote the smooth passage of the dough mass. Polishing the surface of a stainless steel divider bar is capable of rendering a suitable surface, as is treating the surface with a friction-reducing material such as PTFE or titanium nitrite. Of course, any such material should be approved for contact with in-process foods.

Although the invention has been described in connection with a single divider bar, the use of multiple divider bars within the chamber of an extrusion die will be useful for the preparation of multi-layer dough laminates. An odd number of divider bars is preferred.

By way of illustration, a snack chip dough is prepared based on 54.5% (by weight) of Durum wheat flour, 27.25% white dent corn and 18.25% white waxy corn. The dough is prepared by first blending the white dent and white waxy corn and then steam kettle cooking the blend at 200° F. for 12 minutes. The cooked corn is dried in a single pass oven at 200° F. for 13.25 minutes., then milled in a Fitz hammer mill using a 0.040 inch diameter screen and sifted through a Sweco #32TBC screen or a wire cloth having an opening size of 0.0248 inches. The moisture content of the sifted corn product is approximately 21%. The sifted corn and durum wheat flour are combined to provide the proportions mentioned above and blended in a Forberg mixer to a uniform consistency with a finished moisture content of about 16–18%.

The dough described above is extruded through a 5-temperature zone multi-zone, co-rotating, twin screw 65 mm diameter extruder with a 15:1 length:diameter ratio barrel operating at 215 rpm. The mix is metered to the extruder 278 lbs. per hour and water is metered at 118 lbs. per hour. The extruder barrel temperature in zones 1, 2 and 3 is set to 60° F., in zone 4 to 63° F. and in zone 5 to 68° F. Three dough ribbons are extruded through a die, and setting occurs rapidly. Snack chip size pieces are cut from the ribbon, and the pieces are fried continuously in vegetable oil, with an inlet oil temperature of 375° F. and an outlet temperature of 360° F. The fried pieces are cooled, seasoned and packaged as a snack chip snack food.

Figure 4B:
FIG. 4B is an elevational view of a snack chip produced with use of the extrusion die of FIG. 4A.
Figure 5B:
FIG. 5B is an elevational view of a snack chip produced with use of the extrusion die of FIG. 5A.

Various extruder dies are employed, so as to demonstrate the degree of delamination control that is attained through the use of the present invention. As seen in FIGS. 4A and 4B, the placement of the divider bar in relatively close proximity to the die orifice produces a final product that exhibits substantial pillowing—the laminated dough layers have virtually completely delaminated during the cooking process. FIGS. 5A and 5B illustrate a more preferred product texture. Here, placement of the divider bar farther from the die outlet produces a final product that is blistered in appearance. The blisters are characterized as having substantially thick blister walls, approximately 25% to 40% of the thickness of the chip at an unblistered portion. The relatively thick walls of the blisters distinguish the product from conventionally-prepared snack chips that include blisters, as such blisters typically have much thinner walls. Blisters having relatively thick walls can be desired, as such blisters resist breakage as the snack chip product is packaged and transported.

Figure 6A:
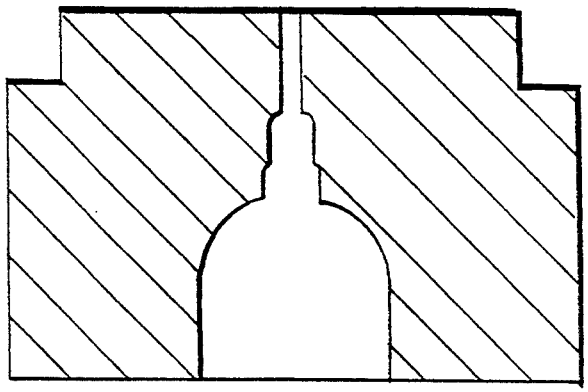
FIG. 6A is an elevational view in section of a prior art extrusion die.
Figure 6B:
FIG. 6B is an elevational view of a snack chip produced with use of the extrusion die of FIG. 6A.

FIGS. 6A and 6B illustrate the results of using the same die geometry seen in FIG. 5A, but without a divider bar. Such a die produces a monolayer product.

Figure 7:
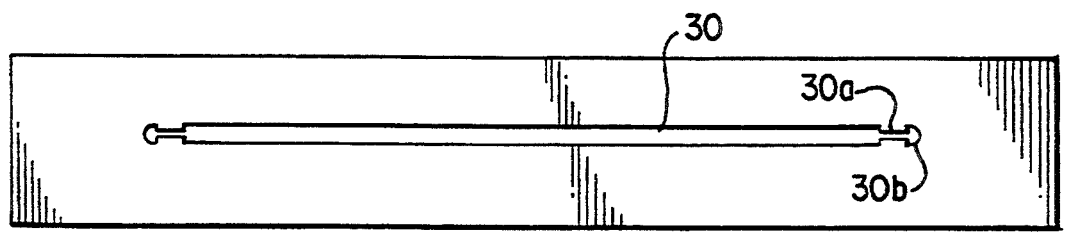
FIG. 7 is a front view of the extrusion die of FIG. 5A.

FIG. 7 illustrates a front view of a particularly preferred die for use in accordance with the present invention. Die 10 includes a die opening 30 which, as is standard in the pasta industry, has portions 30a which are of reduced width and terminating in portions 30b which are of increased width. The extrusion of dough through such an opening provides a dough ribbon having rippled edges.

The dimensions of a die manufactured in accordance with the teachings herein will be selected in view of the overall process in which it is used. For the production of snack-type chips, a die as seen in FIGS. 1, 2 and 5 can include a die opening approximately 2.75 inches in width and a die opening thickness of 0.028 to 0.032 inches. A cylindrical divider bar for use in such a die can have a length of 2.75 inches and a diameter of 0.125 inches. Multiple die openings that operate in parallel can be provided, so that multiple, laminated dough ribbons are simultaneously produced.

The provision of a divider bar in a die according to the present invention presents advantages in addition to the ability to alter the texture of the final product. The divider bar does not alter the shape of the extruded product as controlled by the shape of the die opening, and does not undesirably increase the pressure on the dough mass or the energy needed to extrude it. In addition to the improved delaminated or blistered texture that results from the provision of the divider bar, the divider bar has allowed the extrusion opening itself to be thickened. Thickening the extrusion opening allows the production of product having a good texture, without increasing extruder pressure, product breakage or tendency to fold during frying.

Although the invention has been described in connection with certain embodiments and specific examples, it is not so limited. Modifications will be apparent to those skilled in this field. Thus, while the present invention has been described in connection with extruding an edible dough product, it can find utility in other fields where the continuous extrusion of a laminated mass is desired.

I claim:

1. An extrusion die for extruding a laminated dough product which is capable of partially delaminating when subsequently processed, the die comprising:
    an inlet for receiving a dough mass and an outlet through which an extruded laminated dough product is output;
    a chamber extending in a longitudinal direction between the inlet and outlet such that the dough mass can flow in said longitudinal direction from the inlet to the outlet;
    a divider bar disposed within the chamber for dividing a unitary dough mass into a plurality of dough masses and then reuniting the plurality of dough masses to form, within the chamber, a laminated dough mass which will at least partially separate under subsequent processing;
    wherein said divider bar has a substantially continuous exterior surface the outline of which constitutes a substantially closed path which is substantially covered by dough when dough is present at both the inlet and outlet of said die; and
    wherein the divider bar has a circular cross section with a diameter and a center point, and the center point of the divider bar is disposed away from the die outlet a distance that is greater than the diameter of said divider bar so as to form a laminated dough mass which will partially delaminate upon subsequent processing and produce a final product with a blistered appearance.

2. An extrusion die according to claim 1 wherein the divider bar is disposed in the chamber parallel to a central axis of the die outlet.

3. An extrusion die according to claim 1 wherein the divider bar includes a friction-reducing surface for contacting the dough mass.

4. An extrusion die according to claim 1, wherein the divider bar has a solid cross-section.

* * * * *